United States Patent
Kapeller et al.

(10) Patent No.: US 11,279,034 B2
(45) Date of Patent: Mar. 22, 2022

(54) POSITION MONITORING OF A KINEMATIC LINKAGE

(71) Applicant: B&R INDUSTRIAL AUTOMATION GMBH, Eggelsberg (AT)

(72) Inventors: Thomas Kapeller, Hallwang (AT); Thomas Dirschlmayr, Salzburg (AT)

(73) Assignee: B&R INDUSTRIAL AUTOMATION GMBH, Eggelsberg (AT)

( * ) Notice: Subject to any disclaimer, the term of this patent is extended or adjusted under 35 U.S.C. 154(b) by 405 days.

(21) Appl. No.: 15/471,265

(22) Filed: Mar. 28, 2017

(65) Prior Publication Data

US 2017/0282370 A1 Oct. 5, 2017

(30) Foreign Application Priority Data

Mar. 29, 2016 (AT) .............. A 50256/2016

(51) Int. Cl.
   *B25J 9/16* (2006.01)
(52) U.S. Cl.
   CPC ........... *B25J 9/1676* (2013.01); *B25J 9/1666* (2013.01); *B25J 9/1671* (2013.01); *G05B 2219/39082* (2013.01); *G05B 2219/40202* (2013.01); *G05B 2219/40317* (2013.01); *G05B 2219/40492* (2013.01)
(58) Field of Classification Search
   CPC ...... B25J 9/1676; B25J 9/1666; B25J 9/1671; G05B 2219/39082; G05B 2219/40317; G05B 2219/40492
   USPC ............................................. 703/7
   See application file for complete search history.

(56) References Cited

U.S. PATENT DOCUMENTS

| 4,578,757 A | 3/1986 | Stark |
| 5,056,031 A | 10/1991 | Nakano et al. |
| 5,347,459 A | 9/1994 | Greenspan et al. |
| 7,664,457 B2 | 2/2010 | Suita et al. |

(Continued)

FOREIGN PATENT DOCUMENTS

| DE | 10 2004 019 888 | 11/2004 |
| DE | 10 2007 037 077 | 2/2009 |

(Continued)

OTHER PUBLICATIONS

Merlet 2001 (An improved design algorithm based on interval analysis for spatial parallel manipulator with specified workspace, IEEE 2001 (Year: 2001).*

(Continued)

*Primary Examiner* — Brian S Cook
(74) *Attorney, Agent, or Firm* — Greenblum & Bernstein, P.L.C.

(57) ABSTRACT

In order to detect when a kinematic linkage leaves workspaces and/or enters safe spaces, using little computing power, and therefore doing so more quickly, at least a part of the kinematic linkage is modeled with a number of kinematic objects, and a monitoring space is specified. The number of kinematic objects is modeled in less than two dimensions D<2. For each modeled kinematic object, a geometric variable of a monitoring space is modified by a distance. Each distance is derived from at least one geometric parameter of the modeled kinematic object. The position of each of the number of kinematic objects is checked in relation to the modified monitoring spaces.

19 Claims, 3 Drawing Sheets

(56) References Cited

U.S. PATENT DOCUMENTS 9,452,531 B2 * 9/2016 Kikkeri .................. F16P 3/142
2016/0207198 A1 7/2016 Willför et al.

FOREIGN PATENT DOCUMENTS

| EP | 1 901 151 | 3/2008 |
| JP | H07 36519 | 2/1995 |
| WO | 2015/051815 | 4/2015 |

OTHER PUBLICATIONS

Lou_2005 (A general approach for optimal design of parallel manipulators, IEEE transactions on automation science and engineering 2005). (Year: 2005).*
Wang_2008 (Smart Devices and Mechanics for Advanced Manufacturing, Springer, 2008). (Year: 2008).*
Gill_1998 (Obstacle Avoidance in Multi-Robot Systems, Experiments in Parallel Genetic Algorithms, World Science Series in Robotics and Intelligence Systems—vol. 20, 1998). (Year: 1998).*
Austria Search Report conducted in counterpart Austria Appln. No. A 50256/2016 (dated Dec. 9, 2016).
Europe Search Report/Office Action conducted in counterpart Europe Appln. No. Ep 17 16 3226 (dated Nov. 13, 2017) (w/ partial machine translation).
Elmaraghy et al., "Application of Mapping Concepts to Multi-Robot Collision Avoidance and Task Plan Execution," Proceedings of the Pacific Rim Conference on Communications, Computers and Signal Processing, Victoria (May 19-21, 1993); IEEE, bd. 2 of 02, pp. 466-469, XP000419317.

* cited by examiner

POSITION MONITORING OF A KINEMATIC LINKAGE

CROSS-REFERENCE TO RELATED APPLICATIONS

The present application claims priority under 35 U.S.C. § 119(a) of Austria Patent Application No. A50256/2016 filed Mar. 29, 2016, the disclosure of which is expressly incorporated by reference herein in its entirety.

BACKGROUND OF THE INVENTION

1. Field of the Invention

The present invention relates to a method for position monitoring of a kinematic linkage, wherein at least a part of the kinematic linkage is divided into a number of kinematic objects, and a monitoring area which will be monitored is prespecified.

2. Discussion of Background Information

Since manufacturing processes using robots are increasingly carried out in smaller spaces, the workspaces of robots (also termed kinematic linkages more generally) often overlap with other objects, such as fixed installations, robots, machines or people. Kinematic linkages include both serial kinematics and parallel kinematics, as well as mixtures thereof, wherein serial or parallel kinematics have a number of joints connected to each other in series or in parallel via rigid connecting elements (e.g., a tripod or hexapod). Therefore, in order to guarantee smooth operation, it is necessary to ensure that no collisions occur between a robot and other objects in these shared workspaces. Likewise, the robot, or parts thereof, often must remain within, or must not pass through, areas which are defined for robots, or are defined as safe spaces. In particular, the protection of people and objects must be ensured due to high, and increasing, safety requirements.

Various models of collision monitoring already exist, and usually pose a compromise between accuracy, flexibility and the required computational performance. In most cases, both robots (or their parts) and workspace boundaries are approximated by means of geometric bodies (spheres, pyramids, voxels), and a continuous monitoring during the movement of the robot determines whether there are spatial overlaps between these geometric bodies. This ensures that a robot does not leave a certain workspace and/or does not enter a certain safe space. This is usually accomplished by calculating intersecting points/lines/areas of geometric bodies (e.g., between a robot arm and a safe space). However, this is computationally demanding. DE 10 2007 037 077 A1, for example, determines whether a three-dimensional envelope end enters a boundary zone in a future pose. DE 10 2004 019 888 B2 models robot parts in the form of balls and also checks the penetration of the balls into safe spaces. However, particularly in the field of safety, lower computational demands, and thus a fast response time, are desirable. The lower the reaction time, the later the robot will react to critical situations.

SUMMARY OF THE EMBODIMENTS

Therefore, embodiments of the present invention are directed to a method for recognizing when a kinematic linkage leaves workspaces and/or enters safe spaces, with lower computational demands which result in a faster recognition.

Accordingly, embodiments of the invention are achieved by modeling a number of kinematic objects with less than two dimensions D<2, wherein for each modeled kinematic object at least one geometric variable of the monitoring space is modified by a distance, wherein each distance is derived from at least one prespecified geometric parameter of the modeled kinematic object. The position of the number of kinematic objects is checked in relation to the modified monitoring spaces. The geometric size preferably corresponds to a geometric dimension of the monitoring space. Therefore, the expansion of the monitoring spaces changes as a result of the change in the geometric quantity.

By way of example, the maximum diameter or the maximum spatial extent of a modeled part of a kinematic linkage can be specified as parameter. In this case, the distance of the monitoring space is found from the defined parameter in the form of the maximum diameter or the maximum spatial extent, using a known relationship—by way of example, by the distance corresponding to half the maximum diameter.

In the case of a rectangular modeled part of a kinematic linkage, the maximum diameter can be calculated as parameter, by way of example from two further parameters in the form of the side lengths of the rectangle. The distance can then in turn be calculated from the parameter, using a known relationship, in the form of the maximum diameter.

At least one kinematic object can represent a part of the kinematic linkage, and/or a space outside the kinematic linkage. However, in contrast to known methods, no kinematic object is modeled as a three-dimensional geometric body. Instead, relevant geometric information of the modeled kinematic object (by way of example, dimensions of a robot arm, tool, etc.) is utilized and applied to the monitoring space (the allowed workspace or the forbidden safe space) being monitored. In the context of this method, the monitoring space is increased (in the case of the safe space) or reduced (in the case of the workspace). The consequence of this is that there is no need to compute intersecting points of two three-dimensional geometric bodies—only to compute the intersecting point of a kinematic object having less than two dimensions (point or line) with a zero-, one-, two-, or three-dimensional monitoring space. Thus, for each modeled kinematic object, the relevant monitoring area is modified by inserting subtracting a distance, but the kinematic object itself is not modified. For this reason, the kinematic object need not be treated as a two-dimensional or three-dimensional object. The distance can be inserted on all sides of the monitoring space, or even only on individual sides and/or the sides facing the kinematic object. This safety monitoring is preferably absolutely independent of the dynamic properties of the kinematic object (for example, the robot), such as mass, inertia etc., and independent of the current or future path of the kinematic object under consideration.

At least one kinematic object can be modeled in zero dimensions. In this way, the number of kinematic objects constitute points—for example hubs of a robot joint, tips of a tool, etc.

At least one kinematic object can be modeled in one dimension.

The kinematic object in one dimension can be composed of two modeled point-shaped kinematic objects in zero dimensions, and a defined distance between them.

The monitoring space being monitored can be represented by a point, a line, an area or a body, and can also be composed of individual sub-monitoring spaces which must then be monitored in each case with regard to the number of kinematic objects.

Advantageously, the monitoring space represents a safe space, such that the size of the safe space is increased by the distance for each modeled kinematic object. If the safe space is a rectangle and/or a cuboid, the rectangle and/or the cuboid is thus increased by the distance computed from the geometric parameter of the kinematic object—for example by extending the rectangle sides and/or cuboid sides by the distance. In doing so, the corners of the rectangle and/or the cuboid can again become corners, or can be rounded.

Alternatively, the monitoring space represents a workspace, such that the size of the workspace is reduced by a distance. For example, if the workspace is a rectangle, the rectangles (for example, the side lengths or half the side lengths, . . . ) are each reduced by the distance specified by the geometric parameter of the kinematic object.

This modification can be carried out on all sides of the monitoring space—both in the case of a workspace and a safe space—or on individual sides, such as the side facing the object. If the monitoring space is a circle, the radius and/or diameter of the circle can be modified by the distance, or the radius and/or diameter of the circle can be modified only in the direction of the object, thereby naturally deforming the circle. The same considerations apply, of course, to other monitoring spaces of two dimensions, as well as to monitoring spaces of one dimension (lines) or three (bodies).

The geometry of the monitoring space to be modified is determined in advance, but can also be modified during operation. In principle, the monitoring space is defined by the kinematic linkage itself, and by the movement of the kinematic linkage which will be performed (permitted range of motion, obstacles). However, this basic geometry can also be adapted, for example by means of an expected deviation between a computed position and a real position of the modeled kinematic object. This expected deviation can again be established via known error reaction times, difference quotients, discretization errors, extrapolation inaccuracies, computational inaccuracies, sensor and/or coupling resolutions, offset errors, mechanical deformations, etc.

The distance for each kinematic object may be present in a kinematic table, for example, which uniquely assigns a distance to the kinematic object for the workspace in question.

A great advantage of the method according to the invention is high accuracy. In addition, in the case where there is a tabular storage of the parameters of each kinematic object with respect to the monitoring spaces, a high degree of flexibility is provided.

BRIEF DESCRIPTION OF THE DRAWINGS

The present invention is explained in more detail below with reference to the Figures, which show exemplary, schematic and non-limiting advantageous embodiments of the invention.

DETAILED DESCRIPTION OF THE EMBODIMENTS

Figure 1:
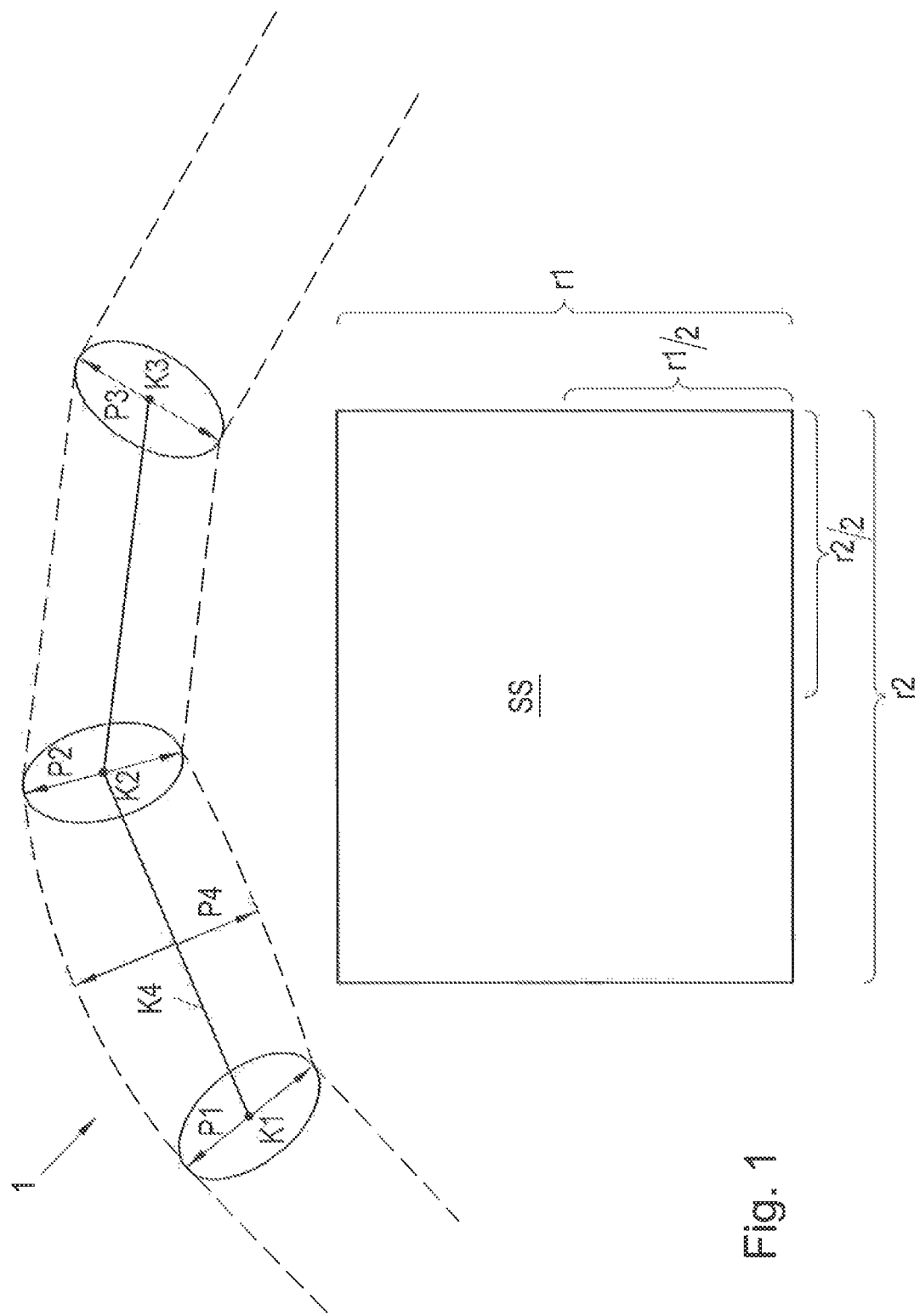
FIG. 1 shows a modeled part of a robot arm.
Figure 2A:
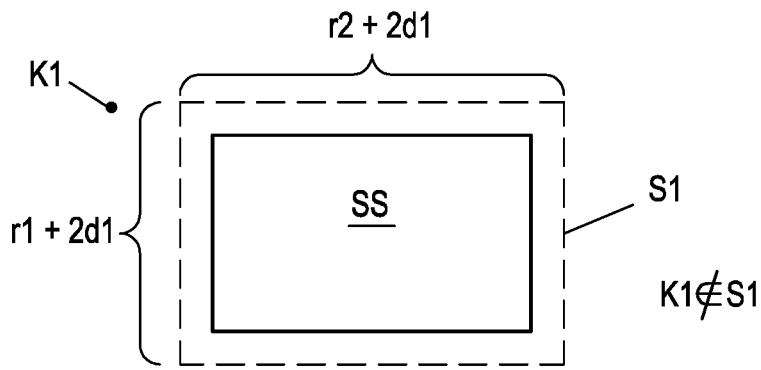
FIGS. 2A-2D show a safe space with four kinematic objects.
Figure 2B:
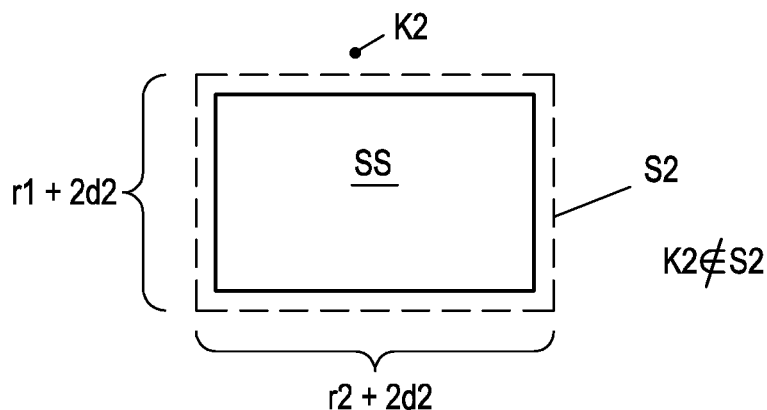
Figure 2C:
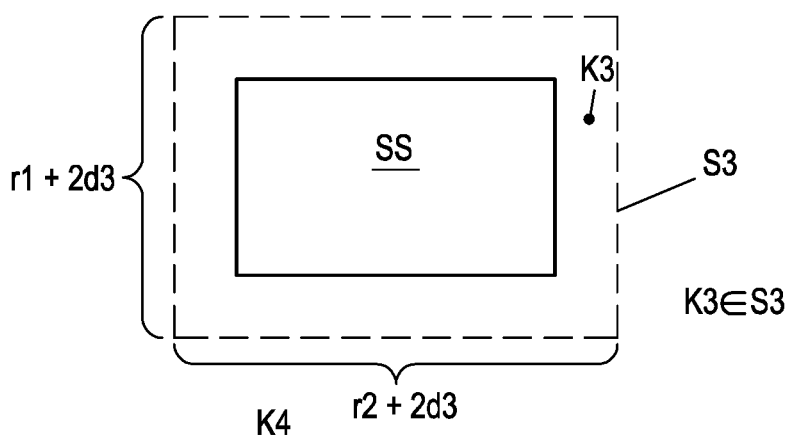
Figure 2D:
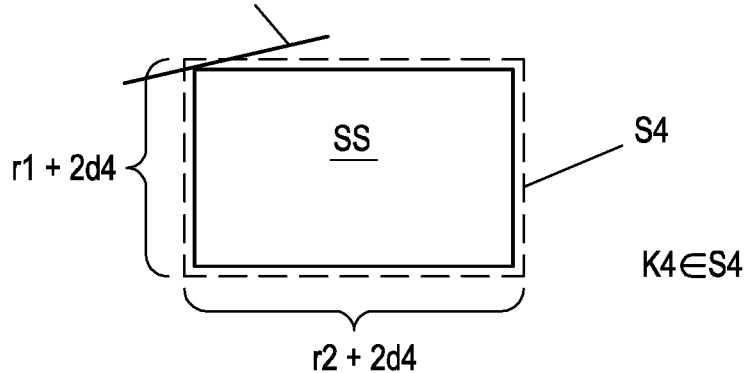

FIG. 1 shows a two-dimensional (to simplify the illustration) part of a robot arm (henceforth referred to as a robot arm) as part of a kinematic system 1—in this case, a serial kinematic linkage—wherein the dashed lines describe the spatial limit of the robot arm 1. The kinematic linkage 1, or a part thereof, is modeled according to the invention with zero dimensional (0d) or one-dimensional (1d) objects—that is, with a dimension D<2—in the following as kinematic objects. In the example of FIG. 1, the robot arm 1 is described by three point-shaped (0d) kinematic objects K1, K2, K3, which in this case represent the joint hubs of the robot arm 1. The modeled kinematic objects K1, K2, K3 could, of course, also describe objects under consideration which are located outside of the kinematic linkage, but which can still be considered part of the kinematic linkage. However, a simplified form of a wireframe model can also be used for modeling the kinematic linkage 1. In this way, line-shaped (1d) kinematic objects K4 are modeled, as shown in FIG. 1, by the connecting line between the first point-shaped kinematic object K1 and the second point-shaped kinematic object K2. A line-shaped (1d) kinematic object K4 preferably connects two point-shaped (0d) kinematic objects K1, K2 or K2, K3 in this case. In the embodiment in FIGS. 2b-c, the point-shaped modeled kinematic objects K1, K2, K3 are considered; in FIG. 2d, the line-shaped kinematic object K4 is considered.

The extension to a wireframe model is optional, as is a possible parameterization of the linear distance of two point-shaped kinematic objects K1, K2, K3. This parameterization and the extension to a wireframe model can be performed separately for each kinematic object K1, K2, K3, K4.

FIG. 1 also shows a prespecified safe space SS as the monitoring space S. The prespecified safe space SS is established, for example, from the installation location and the environment of the kinematic linkage 1 on site, and is defined in advance, and/or can be assumed to be prespecified. A safety function of a kinematic linkage 1 ensures that the kinematic linkage 1 (or a part thereof) does not penetrate into the safe space SS, or does not leave a defined. workspace WS of the kinematic linkage 1. The safety function is, for example, implemented in the controller of the kinematic linkage 1, but can also supplement the controller of the kinematic linkage 1 as an independent module. In the illustrated embodiment, the safe space SS is a rectangle with the side lengths r1, r2 and/or half side lengths r1/2, r2/2. In the case of a robot arm moved in three dimensions, the safe space SS could, of course, also be defined in three dimensions.

According to the prior art, to implement the safety function, the kinematic linkage 1 or a part thereof would be modeled as a three-dimensional object or a sum of three-dimensional objects, wherein an intersection of the object or the objects with the safe space would have to be computed. However, this monitoring is very computationally demanding.

According to the invention, therefore, at least a part of the kinematic linkage 1 is modeled as a number of kinematic objects K1, K2, K3, K4 which each have less than two dimensions (D<2) —that is, in the form of a wireframe model. The position and orientation of the kinematic Objects K1, K2, K3, K4 in the space is always unambiguously established from the known geometry and movement of the kinematic linkage 1, and can therefore be presumed to be known. After the safety function is generally integrated in the control system of the kinematics 1, or at least is connected to it, the safety function can always access the current positions and positions of the kinematic objects K1, K2, K3, K4.

In order to be able to monitor the safe space SS despite the modeling of the kinematic linkage 1 according to the invention, at this point a defined or parameterizable geometrical parameter P1, P2, P3, P4 is used according to the invention for each kinematic object K1, K2, K3, K4, and the prespecified safe space SS is thus modified. For example, a maximum diameter of the respective part of the kinematic linkage 1 is used as the parameter P1, P2, P3, P4 on the number of kinematic objects K1, K2, K3, K4 (the joint hubs, and/or a part of the robot arm). The kinematic linkage 1 (or a part thereof) is "scaled down" by the modeling, which is expressed by the parameters P1, P2, P3, P4. If, in return, the safe space SS/workspace WS is increased/decreased according to this parameter P1, P2, P3, P4, the modeling of the kinematic linkage 1 in the form of kinematic objects K1, K2, K3, K4 can be "compensated" to realize the safety function.

The geometric parameter P1, P2, P3, P4 can follow from, for example, a stored allocation table, which can be parameterized in advance using the known geometry of the kinematic linkage 1. For each modeled kinematic object K1, K2, K3, K4, a first, second and third distance d1, d2, d3, d4 are then computed and/or derived from the geometric parameter P1, P2, P3, P4. In a simple embodiment, the parameter P1, P2, P3, P4 can also correspond directly to the respective distance d1, d2, d3, d4, optionally with a predetermined safety margin. Thus, there is at least one characteristic parameter P1, P2, P3, P4 for the distance d1, d2, d3, d4, wherein the distance d1, d2, d3 d4 can be computed with d1=f(P1), d2=f(P2), d3=f(P3), d4=f(P4) via a given, known, or derivable function f(P1), f(P2), f(P3), f(P4). If, for example, the part of the kinematic linkage 1 has a rectangular cross-section with the side lengths a and b as further parameters, then the parameter of the maximum diameter results from the further parameters, in the form of the root of $a^2+b^2$. The distance d1, d2, d3 d4 then again results from the parameter of the diameter, via a relationship—for example by the distance d1, d2, d3 d4 corresponding to half the diameter. The distance d1, d2, d3, d4 modifies at least one geometric variable G (in this case, half the side lengths r1/2, r2/2) of the safe space SS for each kinematic object K1, K2, K3, K4 and thus leads to the modified safe spaces S1, S2, S3, S4. In the illustrated case, therefore, the geometric variable G in the form of half the side lengths r1/2, r2/2 (not shown explicitly in FIGS. 2A-2D for the sake of clarity) is modified by the distance d1, d2, d3, d4, wherein each side of the rectangle is modified by double the distance 2*d1, 2*d2, 2*d3, 2*d4, The distance d1, d2, d3, d4 can therefore be derived if needed and as desired from the parameter P1, P2, P3, P4, Likewise, if needed, the geometric quantity G to be modified can be selected—in this case, the half side lengths r1/2, r2/2, by way of example. The safe space SS is thus individually modified for each modeled kinematic object K1, K2, K3, K4, and a separate modified monitoring space S1, S2, S3, S4 (in this case, safe space) is assigned to each modeled kinematic object K1, K2, K3, K4. Therefore, in FIG. 2A, for the first modeled kinematic object K1, the half side lengths r1/2, r2/2 as the geometric variable G are increased by the first distance d1, which leads to the modified monitoring space S1. Likewise, in FIGS. 2B-2D, the half side lengths r1/2, r2/2, as the geometric variable G, for the second, third, and/or fourth kinematic objects K2, K3, K4, are respectively increased by the second, third, and/or fourth distance d2, d3, d4, which leads to the monitoring spaces S2, S3, S4.

At this point, for the safety function, the position and orientation of each monitored, modeled kinematic object K1, K2, K3, K4 in space is checked in relation to the modified monitoring space S1, S2, S3, S4 assigned in each case. If, in the example of FIGS. 2A-2D, a modeled kinematic object K1, K2, K3, K4 is situated in the modified monitoring space S1, S2, S3, S4, the monitored monitoring space of the kinematic linkage 1 (in this case, the safe space SS) has been violated, as is the case in FIG. 2C for the third kinematic object K3 in conjunction with the third modified monitoring space S3, and in FIG. 2D for the fourth kinematic object K4 in conjunction with the fourth modified monitoring space S4. For 1d objects as kinematic objects K1, K2, K3, K4, intersecting points of a straight line with an area or a space must be checked. For 0d objects, it is easy to check whether a point lies within an area or a space. Both checks can be carried out with very little computational power.

Of course, a plurality of distances d1, d2, d3, d4 per kinematic object K1, K2, K3, K4 can also be computed for the monitoring space S—for example, in the case of a rectangular monitoring space S, to differentially modify the side lengths r1, r2 and/or the half side lengths r1/2, r2/2. Likewise, the monitoring space S can represent a line (dimension one) or a body (dimension three) instead of the area (dimension two). In this case, the position of the number of kinematic objects K1, K2, K3, K4 must also be checked in relation to the monitoring space S, for example in the form of an intersection.

Figure 3A:
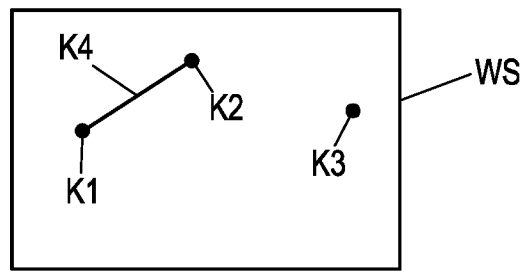
FIGS. 3A-3E show a workspace with four kinematic objects.
Figure 3B:
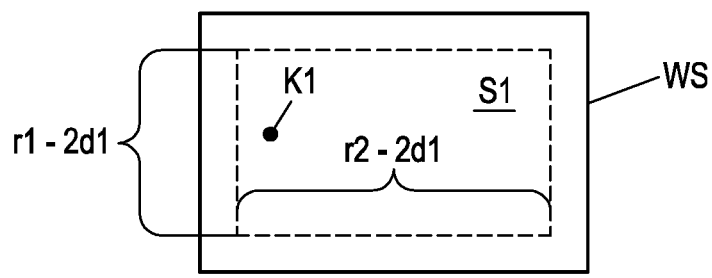
Figure 3C:
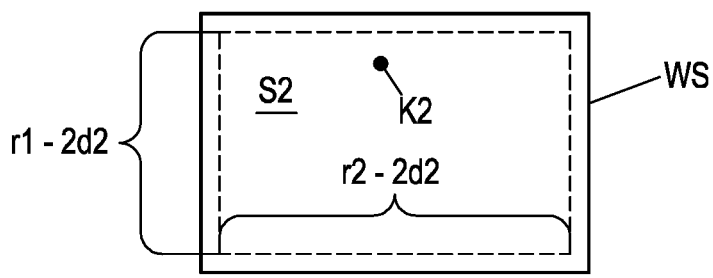
Figure 3D:
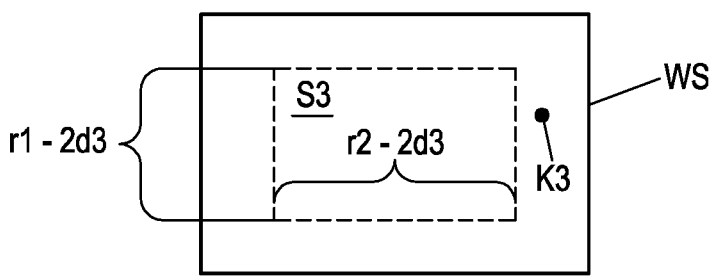
Figure 3E:
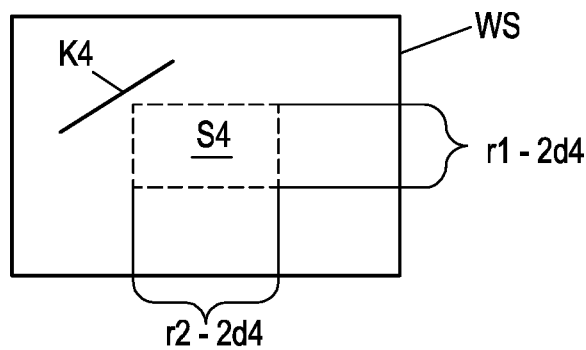

FIGS. 3A-3E illustrate an analogous method for a workspace WS as the monitoring space S. The workspace WS defines a space which the kinematic linkage 1, or a part thereof, is not permitted to leave. Therefore, the distances d1, d2, d3, d4 reduce the at least one geometric variable G—i.e., the half side lengths r1/2, r2/2 (not shown explicitly in FIGS. 3A-3E for clarity) —in the illustrated embodiment. The position and orientation of each monitored, modeled kinematic object K1, K2, K3, K4 are checked in relation to the respectively modified monitoring space S1, S2, S3, S4 analogously to the safe space SS in FIGS. 2A-2D, although, in contrast, a space violation occurs when a modeled kinematic object K1, K2, K3, K4 is outside the modified monitoring space S1, S2, S3, S4, as shown in FIG. 3D for the third kinematic object K3 in relation to the modified monitoring space S3, and in FIG. 3E for the fourth kinematic object K4 in relation to the modified monitoring space S4.

Of course, a plurality of different monitoring spaces S can also be defined. By way of example, each kinematic object K1, K2, K3, K4, or several kinematic objects K1, K2, K3, K4, can have its/their own assigned monitoring space S. In this case, according to the invention, the associated monitoring space S for the respective kinematic object K1, K2, K3, K4 is again modified and checked for violation.

What is claimed:

1. A method for monitoring positions of a mechanical kinematic linkage in relation to a predefined monitoring space, wherein the mechanical kinematic linkage is to be operated to one of avoid a collision with a person, machine or fixed installation within the predefined monitoring space or avoid a collision with a person, machine or fixed installation outside of the predefined monitoring space, comprising:

modeling at least a part of the mechanical kinematic linkage with a number of kinematic objects having fewer than two dimensions;

for each respective kinematic object, modifying at least one geometric variable of the predefined monitoring space by a distance derived from at least one geometric parameter of the respective kinematic object;

checking a position of each respective kinematic object in relation to the predefined monitoring space as modified for the respective kinematic object; and operating the mechanical kinematic linkage based on the checking of the positions of each respective kinematic object in relation to the predefined monitoring space as modified for the respective kinematic object in a manner to prevent the mechanical kinematic linkage, while moving, from one of entering the predefined monitoring space, thereby avoiding the collision with the person, machine or fixed installation within the predefined monitoring space, or leaving the predefined monitoring space, thereby avoiding the collision with the person, machine or fixed installation outside of the predefined monitoring space.

2. The method according to claim 1, wherein at least one of the kinematic objects is modeled in zero dimensions.

3. The method according to claim 1, wherein at least one of the kinematic objects is modeled in one dimension.

4. The method according to claim 1, wherein each kinematic object modeled in one dimension comprises two kinematic objects having zero dimensions, and a defined spacing between two zero dimension kinematic objects.

5. The method according to claim 1, wherein at least one kinematic object models a space outside the kinematic linkage.

6. The method according to claim 1, wherein the monitoring space is a line.

7. The method according to claim 1, wherein the monitoring space is an area.

8. The method according to claim 1, wherein the monitoring space is a body.

9. The method according to claim 1, wherein the predefined monitoring space comprises a safe space having a size, for each kinematic object, that is increased by the distance derived from the at least one geometric parameter of each respective kinematic object.

10. The method according to claim 1, wherein the predefined monitoring space comprises a workspace having a predetermined size, for each kinematic object, that is reduced by the distance derived from the at least one geometric parameter of each respective kinematic object.

11. The method according to claim 1, wherein the geometry of the monitoring space is adapted on the basis of an expected deviation between a computed position and a real position of the kinematic object.

12. A method for determining movement of a mechanical kinematic linkage in relation to a predefined monitoring space, wherein the mechanical kinematic linkage is to be operated to one of avoid a collision with a person, machine or fixed installation within the predefined monitoring space or avoid a collision with a person, machine or fixed installation outside of the predefined monitoring space, the method comprising:
modeling at least a part of the mechanical kinematic linkage with a number of kinematic objects in less than two dimensions;
modifying at least one geometric variable of the predefined safe monitoring space by a distance corresponding to at least one geometric parameter of a first one of the kinematic objects;
modifying at least one geometric variable of the predefined safe monitoring space by a distance being derived from at least one geometric parameter of a second one of the kinematic objects;
checking a position of the first one of the kinematic objects in relation to the monitoring space as modified for the first kinematic object;
checking a position of the second one of the kinematic objects in relation to the monitoring space as modified for the second kinematic object; and
operating the mechanical kinematic linkage based on the checking of the position of the first one of the kinematic objects in relation to the monitoring space as modified for the first kinematic object and the position of the second one of the kinematic objects in relation to the monitoring space as modified for the second kinematic object in a manner to prevent the mechanical kinematic linkage, while moving, from one of entering the predefined monitoring space, thereby avoiding the collision with the person, machine or fixed installation within the predefined monitoring space, or leaving the predefined monitoring space, thereby avoiding the collision with the person, machine or fixed installation outside of the predefined monitoring space.

13. The method according to claim 12, wherein the predefined monitoring space comprises a safe space having a size, for each kinematic object, that is increased by the distance derived from the at least one geometric parameter of each respective kinematic object.

14. The method according to claim 12, wherein the predefined monitoring space comprises a workspace having a size, for each kinematic object, that is reduced by the distance derived from the at least one geometric parameter of each respective kinematic object.

15. The method according to claim 12, wherein, for each additional kinematic objects, the method further comprises:
modifying at least one geometric variable of the predefined monitoring space by a distance derived from at least one geometric parameter of each additional kinematic object; and
checking a position of each additional kinematic object in relation to the monitoring space as modified for each additional kinematic object.

16. The method according to claim 1, wherein the predefined monitoring space comprises a safe space and wherein the checking comprises determining whether any of the respective modeled kinematic objects lie within or extend into the safe space, as a violation of the safe space.

17. The method according to claim 1, wherein the predefined monitoring space comprises a workspace and wherein the checking comprises determining whether any of the respective modeled kinematic objects lie outside of or extend out of the workspace, as a violation of the workspace.

18. A method for monitoring positions of a mechanical kinematic linkage in relation to a predefined monitoring space, wherein the mechanical kinematic linkage is to be operated to one of avoid a collision with a person, machine or fixed installation within the predefined monitoring space or avoid a collision with a person, machine or fixed installation outside of the predefined monitoring space comprising:
modeling at least a part of the mechanical kinematic linkage with a number of kinematic objects having fewer than two dimensions;
for each respective kinematic object, modifying at least one geometric variable of the predefined monitoring space by a distance derived from at least one geometric parameter of the respective kinematic object;
checking a position of each respective kinematic object in relation to the predefined monitoring space as modified for the respective kinematic object; and operating the mechanical kinematic linkage based on the checking of the positions of each respective kinematic object in relation to the predefined monitoring space as modified for the respective kinematic object in a manner to prevent the mechanical kinematic linkage, while moving, from one of entering the predefined monitoring space or leaving the predefined monitoring space.

19. A method for determining movement of a mechanical kinematic linkage in relation to a predefined monitoring space, wherein the mechanical kinematic linkage is to be operated to one of avoid a collision with a person, machine or fixed installation within the predefined monitoring space or avoid a collision with a person, machine or fixed installation outside of the predefined monitoring space, the method comprising:

modeling at least a part of the mechanical kinematic linkage with a number of kinematic objects in less than two dimensions;

modifying at least one geometric variable of the predefined safe monitoring space by a distance corresponding to at least one geometric parameter of a first one of the kinematic objects;

modifying at least one geometric variable of the predefined safe monitoring space by a distance being derived from at least one geometric parameter of a second one of the kinematic objects;

checking a position of the first one of the kinematic objects in relation to the monitoring space as modified for the first kinematic object;

checking a position of the second one of the kinematic objects in relation to the monitoring space as modified for the second kinematic object; and operating the mechanical kinematic linkage based on the checking of the position of the first one of the kinematic objects in relation to the monitoring space as modified for the first kinematic object and the position of the second one of the kinematic objects in relation to the monitoring space as modified for the second kinematic object in a manner to prevent the mechanical kinematic linkage, while moving, from one of entering the predefined monitoring space or leaving the predefined monitoring space.

\* \* \* \* \*